(12) United States Patent
Zangvil et al.

(10) Patent No.: US 11,719,827 B2
(45) Date of Patent: Aug. 8, 2023

(54) SPATIALLY DISTRIBUTED TESTING OF GLOBAL NAVIGATION SATELLITE SYSTEM RECEIVER FOR SPOOFING RESILIENCY

(71) Applicant: Regulus Cyber Ltd., Haifa (IL)

(72) Inventors: Yoav Zangvil, Haifa (IL); Dror Katalan, ShaveiTzion (IL); Stanislav Gutliansky, Haifa (IL); Avner Zangvil, Ramat-HaSharon (IL); Yonatan Zur, Tel Aviv (IL)

(73) Assignee: Regulus Cyber Ltd., Haifa (IL)

( * ) Notice: Subject to any disclaimer, the term of this patent is extended or adjusted under 35 U.S.C. 154(b) by 136 days.

(21) Appl. No.: 17/512,841

(22) Filed: Oct. 28, 2021

(65) Prior Publication Data

US 2023/0140048 A1 May 4, 2023

(51) Int. Cl.
*G01S 19/23* (2010.01)
*G01S 19/03* (2010.01)
*G01S 19/21* (2010.01)

(52) U.S. Cl.
CPC .............. *G01S 19/23* (2013.01); *G01S 19/03* (2013.01); *G01S 19/215* (2013.01)

(58) Field of Classification Search
CPC ................... G01S 19/015; G01S 19/03; G01S 19/21–215; G01S 19/23
See application file for complete search history.

(56) References Cited

U.S. PATENT DOCUMENTS

| | | | | |
|---|---|---|---|---|
| 8,854,260 | B2* | 10/2014 | Boulton | G01S 19/23 |
| | | | | 342/357.62 |
| 9,116,232 | B2* | 8/2015 | Goel | G01S 19/23 |
| 10,739,467 | B2* | 8/2020 | Wang | G01S 19/23 |
| 10,866,323 | B2* | 12/2020 | Kallankari | G01S 19/23 |
| 2010/0127918 | A1* | 5/2010 | Vadlamani | G01S 19/23 |
| | | | | 342/357.62 |
| 2018/0321292 | A1* | 11/2018 | Bartko | G01R 29/0821 |
| 2020/0408823 | A1* | 12/2020 | Gerten | G01S 19/23 |
| 2022/0066049 | A1* | 3/2022 | Krefft | G01S 19/37 |

OTHER PUBLICATIONS

Kaplan, Elliott D. et. al., "Understanding GPS Principles and Applications", Artech House, 2nd ed., 2006 (Year: 2006) (Year: 2006).*

* cited by examiner

*Primary Examiner* — Cassi J Galt (57) ABSTRACT

A system for testing a global navigation satellite system (GNSS) receiver includes signal generators, antennas coupled to respective signal generators and having overlapping antenna radiation patterns, and processing circuitry. The signal generators generate respective test signals. Each of the test signals is a combination of multiple GNSS navigational signals which are generated using a set of ranging codes. The processing circuitry selects respective sets of ranging codes for the signal generators, such that the sets of ranging codes are separately insufficient to lock a GNSS receiver and are jointly sufficient to lock a GNSS receiver.

20 Claims, 7 Drawing Sheets

SPATIALLY DISTRIBUTED TESTING OF GLOBAL NAVIGATION SATELLITE SYSTEM RECEIVER FOR SPOOFING RESILIENCY

FIELD AND BACKGROUND OF THE INVENTION

The present invention, in some embodiments thereof, relates to testing GNSS receivers and, more particularly, but not exclusively, to outdoor testing of the resiliency of GNSS receivers to spoofing attacks.

GNSS receiver manufacturers need to test their receiver's resiliency to Global Navigation Satellite System (GNSS) spoofing attacks during the design process and post manufacturing. To perform these tests, they use a GNSS simulator/generator.

Equipment manufacturers (e.g. of mobile phones, vehicles, autonomous cars, Internet of Things devices, drones, unmanned aerial vehicles, airplanes, critical infrastructure and telecom equipment) also need a way to test the resiliency of their GNSS-based systems to such spoofing attacks.

Most of these tests are performed in a lab setup using radio frequency (RF) cables connected directly between the GNSS module and the GNSS generator. Some are performed in an anechoic chamber that contains RF radiation inside, prevents echoes and prevents external RF radiation from entering. In anechoic chamber tests, an antenna is used to transmit GNSS signals over the air (OTA) along with a GNSS repeater re-radiating live sky signals.

However neither of these types of tests is capable of replicating the real world conditions which the GNSS receiver will actually be operating in. What the industry lacks is a way to test GNSS receivers outdoor, with real-sky signals coming from GNSS satellites in conjunction with simulated signals and interference. The reason that open air GNSS receiver testing is not performed outdoors is because the test signals may cause GNSS receivers which are not under test to lock on to the simulated signals. This may result in miscalculations by the non-tested GNSS receivers with extremely serious effects (for example for aircraft, drones, phone and vehicle GPS systems and cell towers).

SUMMARY OF THE INVENTION

It is an object of the present invention to provide a system and a method for testing GNSS receivers in real-world conditions.

For a GNSS receiver to calculate a location and/or time, correlation peaks for a minimum number of ranging codes must be acquired and tracked. Embodiments of the invention generate two or more RF test signals for transmission. Each test signal is generated using a respective set of GNSS ranging codes, so that the GNSS receiver may acquire and track correlation peaks for the ranging codes in the received signal. Each test signal includes a limited number of ranging codes so that a GNSS receiver cannot lock on to a single received test signal. The ranging codes are selected so that a GNSS receiver receiving multiple test signals may lock on to the combined received signal.

The test signals are transmitted by respective antennas which are deployed in such a way that they have overlapping radiation patterns. Multiple test signals are received when a GNSS receiver is in a location where the antenna radiation patterns overlap, and the total number of ranging codes increases. When the total number of ranging codes reaches the minimal number required, the receiver under track may extract enough navigation messages and calculate the pseudo ranges to solve the navigation equations.

A benefit of the system and method for GNSS receiver testing described herein is that a GNSS receiver may be tested outdoors without the risk of interfering with other GNSS receivers which are not being tested. The GNSS receiver may be stationary on the ground, on a moving vehicle, on a fixed-wing plane, on a flying drone or on any type of unmanned aerial vehicle (UAV) or unmanned aerial systems (UAS). This provides the particular benefit that the resiliency of the GNSS receiver to spoofing attacks may be field tested without endangering other GNSS receivers which might be less resilient to spoofing attacks.

A further benefit is that the GNSS receiver may be tested outdoors with signals coming from multiple directions, making it possible to test Controlled Reception Pattern Antennas (also known as "CRPA" antennas and "smart antennas").

According to a first aspect of some embodiments of the present invention there is provided a system for testing a global navigation satellite system (GNSS) receiver includes signal generators, antennas coupled to respective signal generators and having overlapping antenna radiation patterns, and processing circuitry. The signal generators generate respective test signals. Each of the test signals is a combination of multiple GNSS navigational signals which are generated using a respective set of ranging codes. The processing circuitry selects the respective sets of ranging codes for the signal generators, such that the sets of ranging codes are separately insufficient to lock a GNSS receiver and are jointly sufficient to lock a GNSS receiver.

According to some embodiments of the invention, at least one of the antennas is a directional antenna.

According to some embodiments of the invention, the GNSS receiver is mounted on one of: a ground-based vehicle, a fixed-wing plane, a flying drone, an unmanned aerial vehicle and an unmanned aerial system.

According to some embodiments of the invention, at least one of the antennas is mounted on a rotating gimbal.

According to some embodiments of the invention, the system includes testing unit configured to obtain test data from a GNSS receiver operating within a location of the overlapping antenna radiation patterns. According to some further embodiments of the invention, the testing unit is configured to determine a resilience of the GNSS receiver to a GNSS spoofing attack by analyzing the test data.

According to some embodiments of the invention, at least two of the signal generators are configured for intercommunication over a network.

According to some embodiments of the invention, the sets of ranging codes are selected cooperatively by the signal generators.

According to some embodiments of the invention, the processing circuitry includes a ranging selection server configured to select the sets of ranging codes and to provide the selected sets of ranging codes to the signal generators.

According to some embodiments of the invention, the sets of ranging codes are preset.

According to some embodiments of the invention, the sets of ranging codes are selected based on a coordinated time reference.

According to some embodiments of the invention, the sets of ranging codes are selected as a function of a random encryption key.

According to some embodiments of the invention, the sets of ranging codes are selected as a function of a pseudo-random sequence.

According to some embodiments of the invention, the signal generators are configured for synchronization in time and phase.

According to some embodiments of the invention, the antennas have an effective radiation pattern with a maximum gain of 3 dBi to 30 dBi.

According to a second aspect of some embodiments of the present invention there is provided a method for testing a global navigation satellite system (GNSS) receiver. The method includes: transmitting multiple signals via respective antennas, the antennas having overlapping radiation patterns, and obtaining test data from a GNSS receiver operating in a location within the overlapping antenna radiation patterns. Each of the signals includes multiple GNSS navigational signals generated using a respective set of ranging codes. The sets of ranging codes are separately insufficient to lock a GNSS receiver and are jointly sufficient to lock a GNSS receiver.

According to some embodiments of the invention, the GNSS receiver is integrated into a system and the method includes obtaining test data from the system.

According to some further embodiments of the invention, the system is one of: a ground-based vehicle, a manned aerial vehicle and an unmanned aerial vehicle.

According to some embodiments of the invention, method further includes analyzing the test data to determine a resilience of the GNSS receiver to GNSS spoofing.

According to some embodiments of the invention, the sets of ranging codes are selected cooperatively by signal generators configured to generate the signals.

According to some embodiments of the invention, the method further includes providing the sets of ranging codes over a communication network to respective signal generators configured to generate the signals.

According to some embodiments of the invention, the sets of ranging codes are preset.

According to some embodiments of the invention, the sets of ranging codes are selected based on a coordinated time reference.

According to some embodiments of the invention, the sets of ranging codes are selected as a function of a random encryption key.

According to some embodiments of the invention, the sets of ranging codes are selected as a function of a pseudo-random sequence.

According to some embodiments of the invention, the method further includes synchronizing the signals in time and phase.

According to some embodiments of the invention, the antennas have an effective radiation pattern with a maximum gain of 3 dBi to 30 dBi.

According to a third aspect of some embodiments of the present invention there is provided a signal generator for a global navigation satellite system (GNSS) testing system. The signal generator includes a baseband generator, an upconverter and ranging code selection circuitry. The baseband generator generates a baseband GNSS signal using a set of ranging codes. The upconverter upconverts the baseband GNSS signal to at least one GNSS frequency band. The ranging code selection circuitry selects the set of ranging codes such that that the upconverted signal is insufficient to lock a GNSS receiver and is sufficient to lock a GNSS receiver in combination with transmissions by other signal generators of the testing system.

According to some embodiments of the invention, the ranging code selector is configured to select the set of ranging codes cooperatively with the other signal generators.

According to some embodiments of the invention, the ranging code selector is configured to obtain the set of ranging codes from a server.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL
VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. In the Drawings.

DESCRIPTION OF SPECIFIC EMBODIMENTS OF THE INVENTION

The present invention, in some embodiments thereof, relates to testing GNSS receivers and, more particularly, but not exclusively, to outdoor testing of the resiliency of GNSS receivers to spoofing attacks.

In standard GNSS technology, a GNSS receiver searches for a signal from a navigation satellite by comparing a local copy of a ranging code (e.g. a PRN code) to a received radio frequency (RF) signal. Each ranging code is associated with a specific satellite and the ranging codes of different satellites have low correlation. When a correlation is found between a particular ranging code sequence and a received signal, the correlation indicates that signals transmitted by the associated satellite are being received.

In a typical GNSS receiver each channel performs simultaneous computations on the RF signal data in the standard form of a stream of complex values in I/Q being omitted from a radio component. Each channel has two distinct modes: acquisition and tracking. During the acquisition stage, the GNSS receiver searches for correlation with a local copy of the ranging code in a 2D space (Doppler shift and code shift). During the tracking stage, the correlation maximum is sequentially searched and maintained to so that the satellite signal and the ranging code sequence generated by the receiver are continually synchronous. To solve the navigation equations, data must be obtained from a minimum number of tracked GNSS signals. If the GNSS receiver cannot acquire and/or track correlation peaks for the minimum number of ranging codes, the GNSS receiver cannot solve the navigation equations and determine the location.

Embodiments of the invention transmit multiple test signals. Each test signal is generated based on a limited set of ranging codes. The ranging codes in the sets are selected so that reception of a single test signal will not cause a target GNSS receiver to lock on the transmitted signal. The test signals are transmitted via respective antennas which have overlapping antenna radiation patterns in one or more locations. When the tested GNSS receiver is placed in a location in which multiple antenna radiation patterns overlap, it is able to receive transmissions from multiple receivers so that the number of ranging codes that may be tracked in the combined signal is large enough for the GNSS receiver to lock on. However GNSS receivers outside the overlapping locations will receive signals generated using insufficient ranging codes and their performance will not be affected by the test signals.

As used herein the term "test signal" means a signal that is output by a signal generator.

As used herein the term "ranging code" means a data sequence associated with a GNSS satellite which allows the receiver to acquire a correlation peak in a GNSS signal and calculate the pseudo ranges required to solve the navigation equations.

As used herein the term "overlapping antenna radiation pattern" means that signals transmitted by the antennas may be received at the same geographical location.

As used herein the term "lock on to" means the GNSS receiver acquires and tracks GNSS signals on enough channels to extract the navigation message, calculate pseudo ranges and calculate a PVT (position, velocity, time) solution.

The GNSS receiver being tested may be of any type and may be suitable for any type of GNSS system or systems. Types of GNSS receivers include but are not limited to:
1) GNSS hardware receiver (such as a chip receiver, either standalone chip or a part of another device such as a central processing unit or field programmable gate array);
2) GNSS multi-constellation receiver;
3) GNSS multi-frequency receiver;
4) GNSS differential receiver; and
5) A software-defined GNSS receiver.

Types of GNSS systems include but are not limited to:
1) Global Positioning System (GPS);
2) Global Navigation Satellite System (GLONASS);
3) BeiDou Navigation Satellite System (BDS);
4) Galileo;
5) Quasi-Zenith Satellite System (QZSS), also known as Michibiki; and
6) Indian Regional Navigation Satellite System (IRNSS/NjavIC).

Types of antennas include but are not limited to:
1) Ceramic Patch Antenna;
2) Dipole Antenna;
3) Helix Antenna;
4) Microstrip PCB Antenna;
5) Horn Antenna;
6) Parabolic Dish Antenna;
7) "Ducky" Omni Antenna;
8) Yagi Antenna.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The flowchart and block diagrams in the Figures illustrate the architecture, functionality, and operation of possible implementations of systems and methods according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

GNSS Receiver Testing System

A system for testing a GNSS receiver (also denoted herein a testing system) includes signal generators coupled to respective antennas and processing circuitry.

Each of the signal generators generates a test signal using a respective set of GNSS ranging codes. The test signals essentially simulate GNSS signals which may be transmitted by one or more sources (e.g. satellite, spoofer or other source). The ranging codes used to generate the test signals may belong to any GNSS system and/or to multiple types of GNSS systems, including but not limited to: GPS, GLONASS, BeiDou, Galileo, IRNSS and QZSS.

Optionally, at least one of the signal generators includes a baseband generator which generates a baseband test signal. The baseband test is upconverted to the appropriate GNSS frequency band prior to transmission. An exemplary embodiment of a signal generator is described below with reference to FIG. 5.

Optionally, at least two of the signal generators communicate directly (e.g. via a wired communication network such as Ethernet). Alternately or additionally, the signal generators communicate with a centralized server.

The antennas have overlapping antenna radiation patterns. When a GNSS receiver is placed in a location in which the antenna radiation patterns overlaps, it may receive test signals generated by multiple signal generators. The coverage of the main lobe of the antenna (e.g. omnidirectional, sector, cone. slice, etc.) depends on the type of antenna.

Some or all of the antennas may be omnidirectional, however only portions in overlapping radiation pattern regions are susceptible to testing.

Optionally, at least one of the antennas is a directional antenna. Alternately or additionally, at least one of the antennas is an omnidirectional antenna.

It will be appreciated that embodiments of the testing system described herein are suitable for deployment outdoors, so that the testing system is not limited to operation in an indoors or laboratory environment.

Optionally the antennas are installed in fixed outdoor locations. Because the antenna location is geographically fixed and the antenna radiation pattern is known, a testing region in which GNSS receivers are tested may be established. In alternate optional embodiments, the antennas are mobile and may be positioned in desired outdoor locations based on the desired testing location for the GNSS receiver.

As used herein the term "region" means overlapping portions of the antenna pattern in which a GNSS receiver may be tested. Typically the region will be three-dimensional and encompass locations on the ground and/or aerial locations. The specific locations at which the receiver is tested may be selected from within the region based on the testing requirements.

Optionally, one or more of the antennas are mounted on a rotating gimbal that allows for pointing the antenna to a desired direction, either manually or based on positioning sensors (such as cameras, radars and RF signature detectors).

Optionally, the antennas have an effective radiation pattern with a maximum gain of 3 dBi to 30 dBi.

The processing circuitry (denoted herein the ranging code selector) selects respective sets of ranging codes for each of the signal generators. The codes are selected so that such that each set of ranging codes is in itself not sufficient for a GNSS receiver to lock on to and extract enough navigation information to solve the navigation equations. However the sets of ranging codes together may form a combined set sufficient for a GNSS receiver to lock on to.

A test receiver may be positioned in a physical location in which it may receive signals transmitted by multiple signal generators (i.e. the antenna radiation patterns overlap). The received signals form a combined simulated test signal, which may be used to test the GNSS receiver's operation under various scenarios of interest. The GNSS receiver under test may also receive signals that were not generated and transmitted by the testing system. The sets of ranging codes and other parameters (e.g. transmitted signal powers, frequency bands, etc . . . . ) are selected so that the desired scenario may be tested.

Optionally, the receiver under test is installed on an unmanned aerial vehicle (UAV) such as a drone. By positioning the UAV in different aerial locations, the resilience of the GNSS receiver to spoofing attacks originating from one or several directions may be tested.

Optionally, the testing system further includes a testing unit which obtains test data from a GNSS receiver operating at a location covered by the overlapping antenna radiation patterns. Further optionally, the testing unit analyzes the test data. This analysis may determine whether the tested GNSS receiver is resilient to a GNSS spoofing attack.

Optionally, a GNSS receiver is considered not resilient to a spoofing attack if it locks on to test signals simulating a spoofing attack.

Optionally, the signal generators "simulate" different directions of arrival. To test a GNSS receiver with an adaptive antenna (e.g. CRPA), three, four, five or more signal generators may be used, each generating a test signal from a single ranging code.

As used herein the term "processing circuitry" means a hardware element running dedicated software, capable of selecting sets of ranging codes for the receiver. The processing circuitry is not necessarily centralized in a single location, but may be distributed in various system elements (e.g. in multiple signal generators and/or central server). Furthermore, the processing circuitry may perform additional data processing and/or signal processing tasks.

As used herein the terms "set of ranging codes is in itself not sufficient for a GNSS receiver to lock on to" and "separately insufficient to lock a GNSS receiver" mean that the GNSS receiver cannot track the signal for enough time to extract enough information (e.g. navigation messages) and/or calculate pseudo ranges to solve the navigation equations from a GNSS test signal generated using a single set of ranging codes.

As used herein the term "jointly sufficient to lock a GNSS receiver" means a GNSS receiver may lock on to a combination of received test signals.

As used herein the term "combined set of ranging codes" means a set containing the ranging codes used by multiple signal generators to generate respective test signals.

As used herein the term "combined signal" means the sum of the GNSS signals generated using the sets of ranging codes as received by the receiver under test in the overlapping antenna radiation pattern region.

Selecting Sets of Ranging Codes

Each of the signal generators uses a respective set of ranging codes to generate the simulated GNSS signal. As described herein, each set should not include ranging codes which a GNSS receiver may lock on to when it receives only a single test signal. The sets should also be selected so that a GNSS receiver is capable of locking on to a combined test signal resulting from the transmissions originating from multiple signal generators.

Options for selecting the sets of ranging codes include but are not limited to:

1. The signal generator uses the same set of ranging codes at all times (i.e. the ranging codes are preset in the signal generator, optionally with the ability to change the set when it is offline). For example, the code set for one signal generator may be GPS PRNs 8, 10, 16, 18 and the code set for the second signal generator may be GPS PRNs 21, 22, 23, 27;
2. Each signal generator "hops" between ranging codes. A "round robin" approach may be used, in which a signal generator transmits a test signal using a set of codes for a short amount of time (e.g. anything from a few milliseconds to a few seconds), and hops to a new set of codes when triggered (e.g. when triggered by the 1 PPS signal).
3. The signal generators negotiate which ranging codes are included in each code set based on a coordinated time reference such as Coordinated Universal Time (UTC);
4. The signal generators negotiate which ranging codes are included in each code set as a function of a random encryption key or a pseudorandom sequence;
5. A central server assigns ranging codes to each set and provides the sets to the respective signal generators.

Synchronization

Optionally each of the signal generators contains and is driven by an accurate clock which is used to synchronize the signal generators in time and phase. For example, 1 PPS signal from an onboard GNSS receiver is used to trigger the start of the transmission on each signal generator. A network connection between all signal generators allows the sending of start/stop commands.

Examples of accurate clocks include bus are not limited to:
1) GPSDO (GPS disciplined oscillator);
2) A high-end OCXO;
3) A Rubidium clock; and
4) A Cesium clock.

Exemplary Testing Systems

Referring now to the drawings, FIGS. 1-4 are simplified diagrams of GNSS receiver testing systems, according to respective exemplary embodiments of the invention.

For clarity, some of the embodiments described herein present non-limiting exemplary systems and methods based on two signal generators with overlapping antenna radiation patterns in a single region. As will be appreciated, other embodiments may:
1) Include three or more signal generators and antennas; and/or
2) Have multiple overlapping antenna radiation pattern regions; and/or
3) Include regions in which not all of the antenna radiation patterns overlap.

The system may thus be adapted for different testing locations and scenarios. For example, the antennas may be positioned so that multiple GNSS receivers may be tested under different conditions simultaneously by placing them in locations with different overlaps of the antenna radiation patterns.

Figure 1:
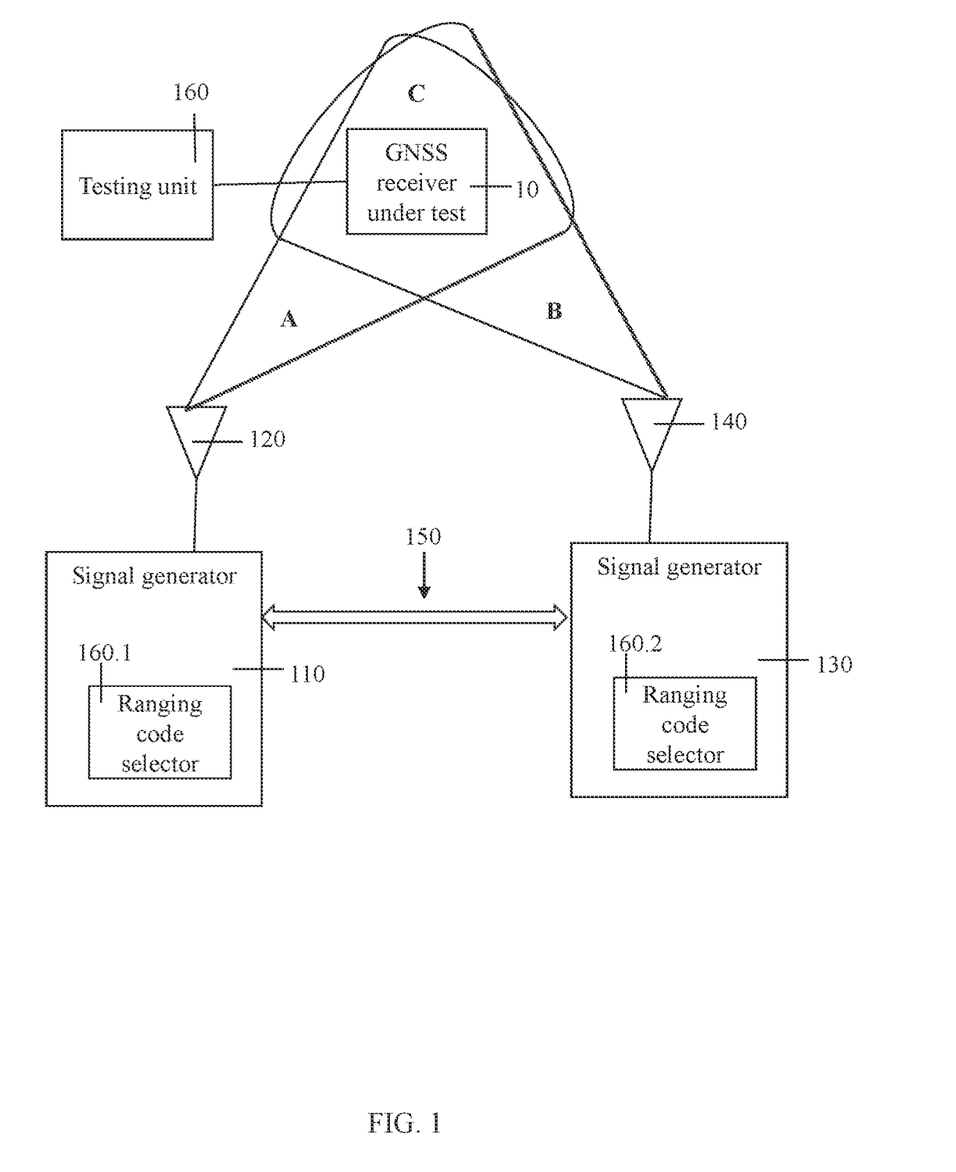
FIGS. 1, 2, 3 and 4 are simplified diagrams of GNSS receiver testing systems, according to respective exemplary embodiments of the invention.

Reference is now made to FIG. 1 which illustrates an exemplary testing system which includes two signal generators. Signal generators 110 and 130 are coupled to antennas 120 and 140 respectively. Signal generators 110 and 130 communicate directly over Ethernet connection 150.

The antenna radiation patterns overlap in region C. GNSS receiver under test 10 in region C may receive signals transmitted by both signal generators. A GNSS receiver operating in region A may receive signals from signal generator 110 but not from signal generator 130. A GNSS receiver operating in region B may receive signals from signal generator 130 but not from signal generator 110.

Testing unit 160 is connected to GNSS receiver 10 in order to obtain test data from GNSS receiver 10, during and/or after the test. Testing unit 160 may be positioned in any location in which it may communicate with GNSS receiver 10. For clarity, testing unit 160 is illustrated as being outside of region C in which GNSS receiver 10 is located however this is not limiting.

Ranging code set selection is performed cooperatively by communication between signal generators 110 and 130, as illustrated schematically by ranging code selectors 160.1-160.2.

Figure 2:
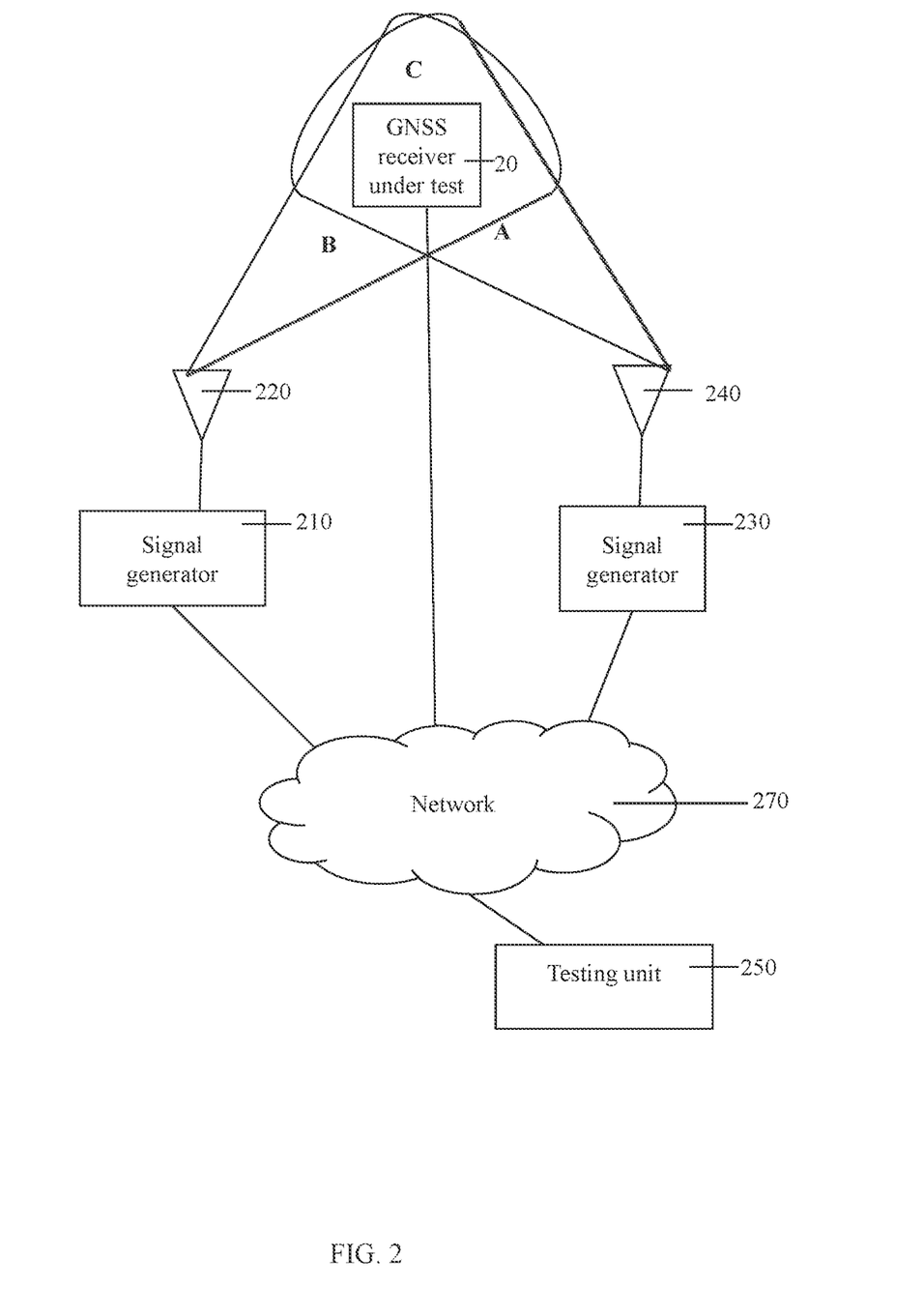

Reference is now made to FIG. 2 which illustrates an exemplary testing system which includes two signal generators. Signal generators 210 and 230 are coupled to antennas 220 and 240 respectively. The antenna radiation patterns overlap in region C. GNSS receiver under test 20 may receive signals transmitted by both signal generators. The testing system also includes testing unit 260 which communicates with GNSS receiver 20. Ranging code set selection may be performed cooperatively by signal generators 210 and 230 and/or by testing unit 250. Signal generators 210 and 230 and testing unit 250 communicate over network 270.

Figure 3:
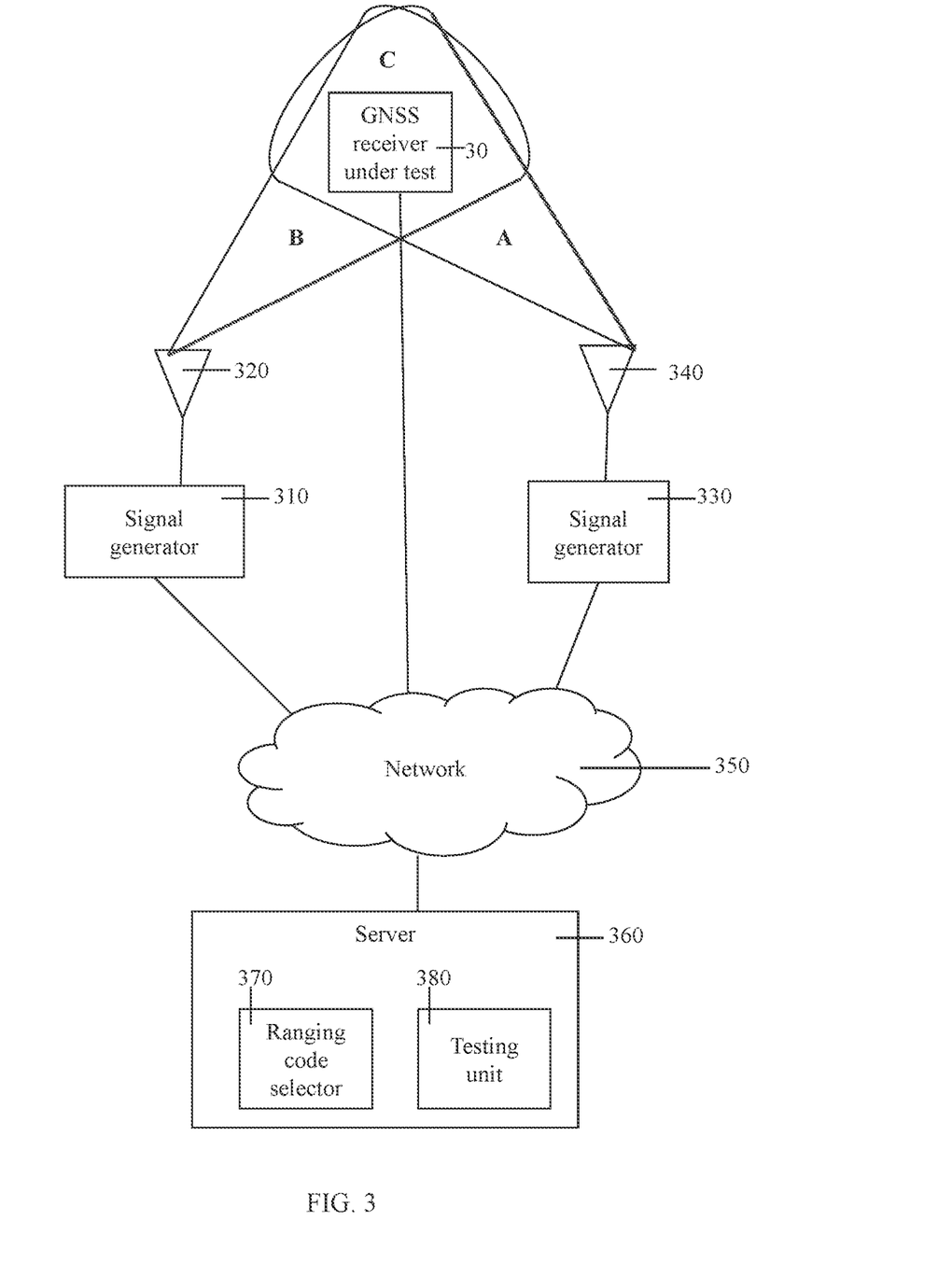

Reference is now made to FIG. 3 which illustrates an exemplary testing system which includes two signal generators. Signal generators 310 and 330 are coupled to antennas 320 and 340 respectively. GNSS receiver under test 30 in region C may receive signals transmitted by both signal generators. The testing system also includes server 360 which performs ranging code selection and obtains and analyzes test data from GNSS receiver under test 30 (illustrated schematically by ranging code selector 370 and testing unit 380). Signal generators 310 and 330, GNSS receiver under test 30 and server 360 communicate over network 350.

Figure 4:
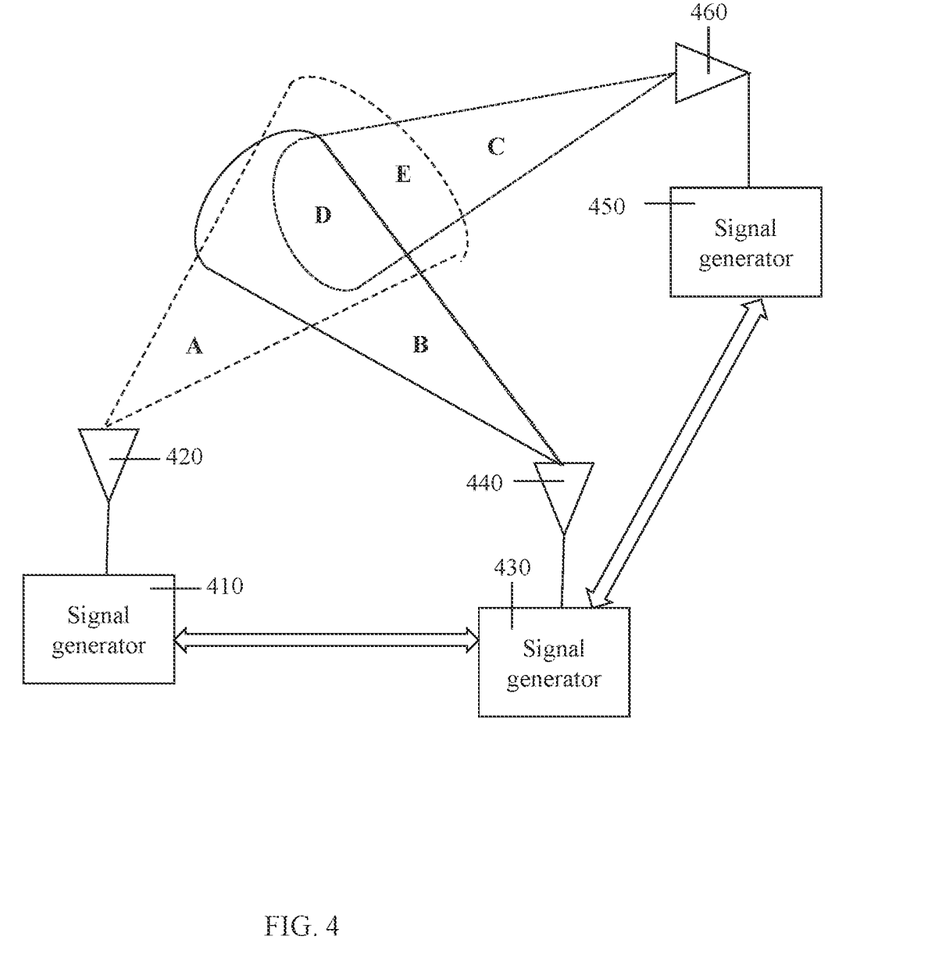

Reference is now made to FIG. 4 which illustrates an exemplary testing system which includes three signal generators. Signal generators 410, 430 and 450 are coupled to antennas 420, 440 and 460 respectively. Signal generators 410, 430 and 450 communicate over an Ethernet network. The antenna radiation patterns of antennas 420, 440 and 460 overlap in region D. A GNSS receiver under test in region D may receive signals transmitted by all three signal generators. A GNSS receiver operating in region E may receive signals from signal generators 410 and 450 but not from signal generator 430. A GNSS receiver operating in region B will receive signals from signal generator 430 but not from signal generators 410 and 450.

Figure 5:
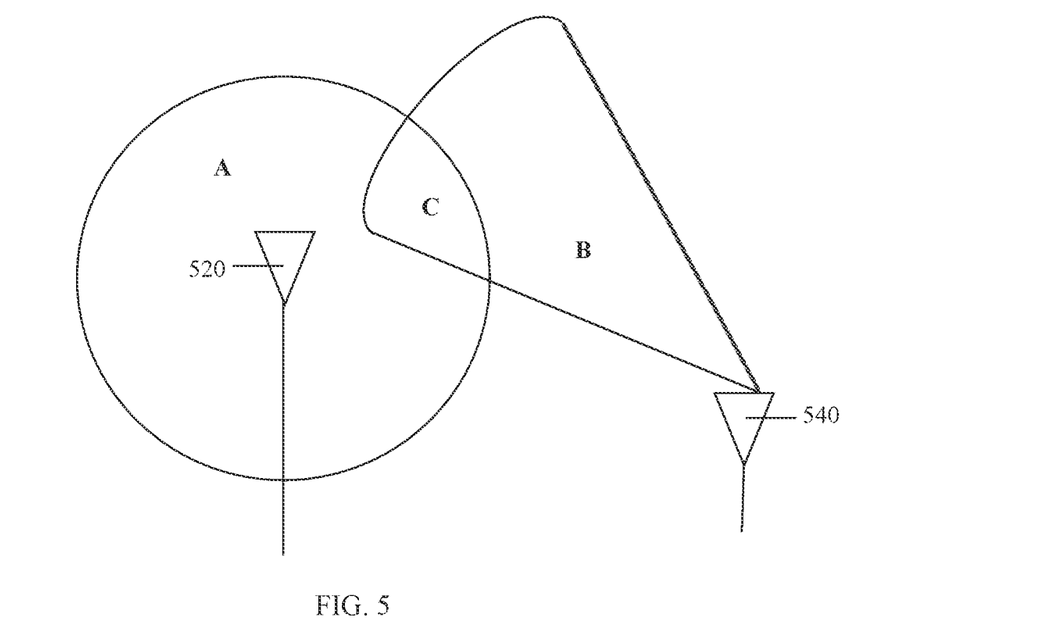
FIGS. 5 and 6 are simplified examples of overlapping antenna radiation patterns with omnidirectional antennas.

Reference is now made to FIG. 5 which is a simplified example of overlapping antenna radiation patterns for omnidirectional antenna 520 and directional antenna 540. The antenna radiation patterns overlap in region C and do not overlap in regions A and B. A GNSS receiver under test in region C may receive signals emitted by both antennas 520 and 540. A GNSS receiver operating in region A may receive signals emitted by antenna 520 but not from antenna 540. A GNSS receiver operating in region B may receive signals emitted by antenna 540 but not from antenna 520.

Figure 6:
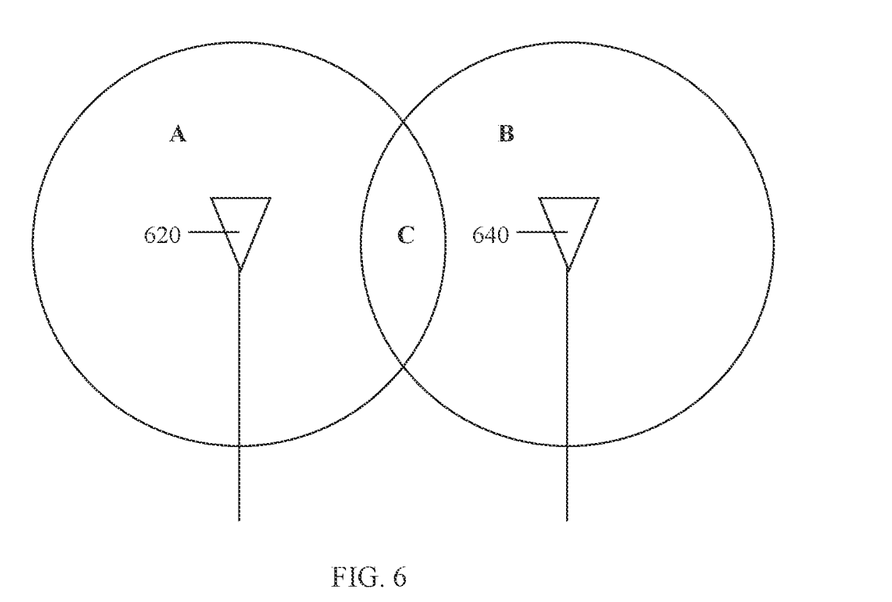

Reference is now made to FIG. 6 which is a simplified example of overlapping antenna radiation patterns for omnidirectional antenna 620 and omnidirectional antenna 640. The antenna radiation patterns overlap in region C and do not overlap in regions A and B. A GNSS receiver under test in region C may receive signals emitted by both antennas 620 and 640. A GNSS receiver operating in region A may receive signals emitted by antenna 620 but not from antenna

640. A GNSS receiver operating in region B may receive signals emitted by antenna 640 but not from antenna 620.

Signal Generator

Figure 7:
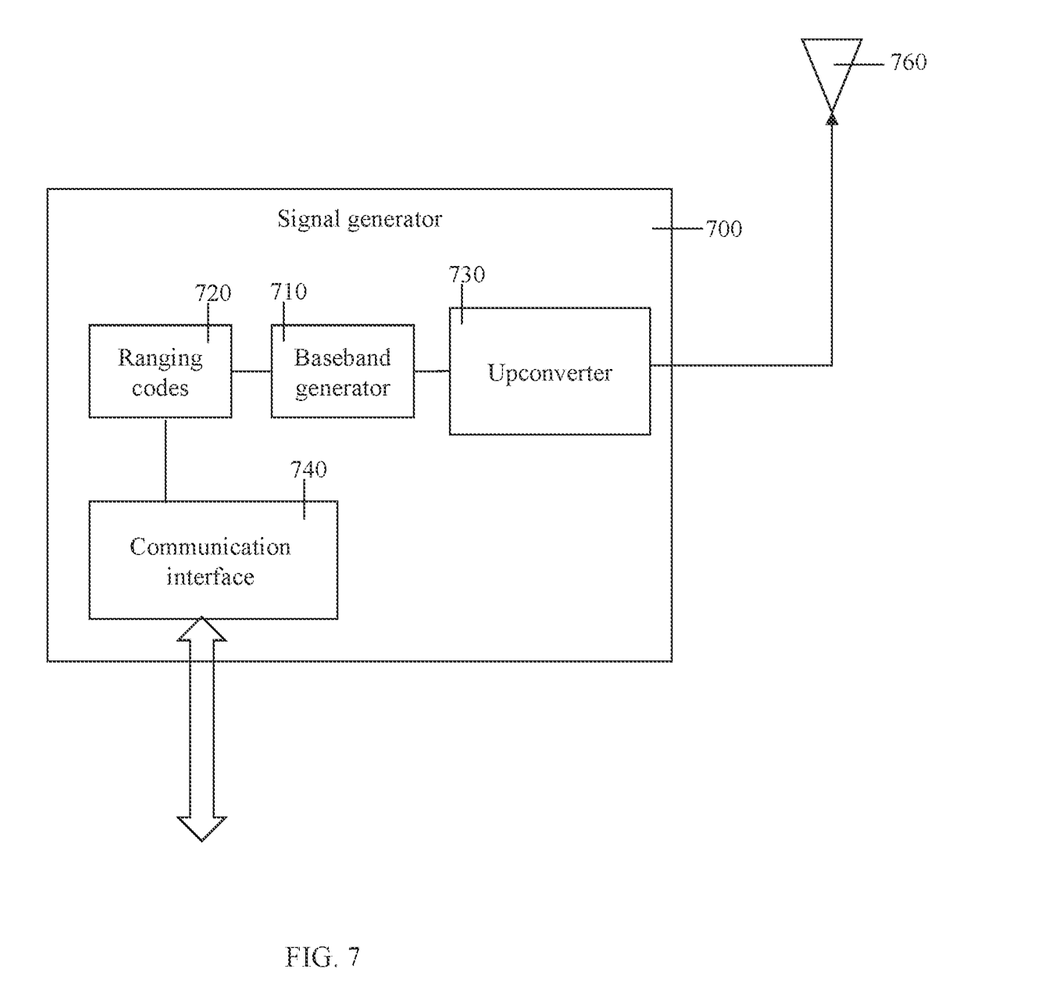
FIG. 7 is a simplified block diagram of a signal generator for a GNSS testing system according to embodiments of the invention.

Reference is now made to FIG. 7, which is a simplified block diagram of a signal generator for a GNSS testing system according to embodiments of the invention. Signal generator 700 includes baseband generator 710 and upconverter 730.

Baseband generator 710 which generates a baseband GNSS signal using a set of ranging codes 720, substantially as described above. Ranging codes 720 yield a test signal at the output of signal generator 700 which is in itself insufficient to lock a GNSS receiver and is sufficient to lock a GNSS receiver in combination with suitable additional received test signals.

Optionally, signal generator 700 includes a software defined radio running on a hardware computing device with a graphics processing unit (GPU). In contrast, most commercial simulators use dedicated hardware and field programmable gate arrays (FPGAs) to generate the signal.

Optionally, the computing device executes processing instructions (i.e. software) that splits the ranging codes into sets and decides which signal generator transmits which ranging code(s) at any point in time. The software also ensures that the generators are synchronized with each other and to signals coming from satellites in orbit.

Optionally, when the set of ranging codes includes codes for signals on multiple frequency bands, baseband 710 generates separate signals for each frequency band and provides these signals in parallel to upconverter.

The set of ranging codes 720 may be established by many techniques, including but not limited to:
  i. Preset;
  ii. Selected cooperatively with other system elements (e.g. other signal generators, a mediating agent such as a testing unit); and
  iii. Provided by a server.

Upconverter 730 generates a test signal from the baseband GNSS signal provided by baseband generator 710 by upconverting the baseband signal(s) to one or more GNSS frequency bands.

Optionally, signal generator 700 includes communication interface 740 for communicating with other elements of the testing system and/or external devices.

As will be appreciated by the skilled person, signal generator 700 may include other RF and digital processing elements (e.g. filters, amplifiers, digital processor, etc.), as required to obtain a signal that accurately simulates GNSS signal(s) and is suitable for transmission via antenna 760.

Method for Outdoor Testing of a GNSS Receiver

Figure 8:
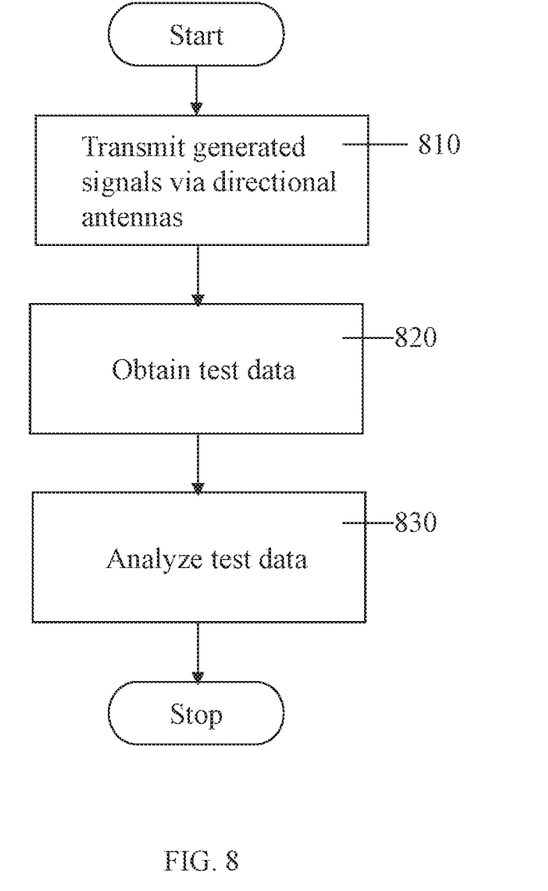
FIG. 8 is a simplified flowchart of a method for testing a GNSS receiver, according to embodiments of the invention.

Reference is now made to FIG. 8, which is a simplified flowchart of a method for testing a global navigation satellite system (GNSS) receiver, according to embodiments of the invention.

In 810 multiple test signals are transmitted via respective antennas.

The antennas have overlapping radiation patterns. Optionally, at least one of the antennas is a directional antenna. Alternately or additionally, at least one of the antennas is an omnidirectional antenna.

Optionally, the antennas have an effective radiation pattern with a maximum gain of 3-30 dBi.

Each of the test signals is generated using a respective set of ranging codes, resulting in a combined test signal that includes multiple GNSS navigational signals. Each test signal includes a limited number of ranging codes so that a GNSS receiver cannot lock on to a single received test signal. The sets of ranging codes are selected so that they are jointly sufficient to lock a GNSS receiver receiving transmissions from multiple signal generators.

In 820, test data is obtained from a GNSS receiver operating in a location within the overlapping antenna radiation patterns.

Optionally, in 830 the test data is analyzed. The results of the analysis may include but are not limited to:
  i. The resilience of the GNSS receiver to spoofing attacks and/or local interference; and
  ii. The behavior of the system using the GNSS data.

Optionally, the method further includes synchronizing the test signals in time and phase.

Optionally, the method further includes positioning the antennas and GNSS receiver under test in the correct location and/or orientation. The antennas and GNSS receiver may be positioned in an outdoor location so that the test may be performed outdoors, under real-world conditions.

Optionally, the GNSS receiver is integrated into a system (such as the platform or vehicle on which the GNSS receiver is mounted). Further optionally, the method includes obtaining test data from the system. The test data obtained from the system may include the test data from the GNSS receiver and/or data regarding the operation of the system itself.

Types of systems into which the GNSS receiver may be integrated include but are not limited to:
  a) A ground-based vehicle (e.g. an automobile);
  b) A manned aerial vehicle (e.g. a fixed-wing plane);
  c) A flying drone;
  d) A UAV; and
  e) A UAS.

The testing may be performed while the system is in motion and/or is stationary.

Options for selecting the sets of ranging codes include but are not limited to:
  1. The ranging codes are selected cooperatively by multiple signal generators;
  2. The sets of ranging codes are provided to the signal generators over a communication network, for example by a central server.
  3. The sets of ranging codes are preset;
  4. The sets of ranging codes are selected based on a coordinated time reference;
  5. The sets of ranging codes are selected as a function of a random encryption key;
  6. The sets of ranging codes are selected as a function of a pseudo-random sequence; and
  7. The signal generators hops between ranging codes (e.g. using a "round robin" approach).

Embodiments of the invention described herein provide an efficient way of testing a GNSS receiver in real-world conditions without creating safety hazards for other GNSS receivers outside a limited test region.

It is expected that during the life of a patent maturing from this application many relevant antennas, baseband generators, signal generators, GNSS systems, GNSS receivers, GNSS receiver test parameters and networks will be developed and the scope of the term antenna, baseband generator, signal generator, GNSS, GNSS receiver, GNSS receiver testing and network is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicants that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for testing a global navigation satellite system (GNSS) receiver, comprising:
   a plurality of signal generators configured to generate respective signals, each of said signals comprising a plurality of GNSS navigational signals generated using a respective set of ranging codes;
   a plurality of antennas coupled to respective ones of said signal generators and having overlapping antenna radiation patterns in an outdoor location; and
   at least one processing circuitry associated with said signal generators, configured to select said sets of ranging codes such that said sets of ranging codes are insufficient to lock a GNSS receiver operating in a region outside said overlapping antenna radiation patterns and are sufficient to lock a GNSS receiver operating inside said region.

2. A system according to claim 1, wherein at least one of said antennas comprises a directional antenna.

3. A system according to claim 1, wherein said GNSS receiver is mounted on one of: a ground-based vehicle, a fixed-wing plane, a flying drone, an unmanned aerial vehicle and an unmanned aerial system.

4. A system according to claim 1, wherein at least one of said antennas is mounted on a rotating gimbal.

5. A system according to claim 1, wherein at least two of said signal generators are configured for intercommunication over a network.

6. A system according to claim 1, wherein said sets of ranging codes are selected cooperatively by said signal generators.

7. A system according to claim 1, wherein said processing circuitry comprises a ranging selection server configured to select said sets of ranging codes and to provide said selected sets of ranging codes to said signal generators.

8. A system according to claim 1, wherein said sets of ranging codes are preset.

9. A system according to claim 1, wherein said signal generators are configured for synchronization in time and phase.

10. A system according to claim 1, wherein said antennas have an effective radiation pattern with a maximum gain of 3 dBi to 30 dBi.

11. A method for testing a global navigation satellite system (GNSS) receiver, comprising:
    positioning a plurality of antennas to create an overlapping radiation pattern in an outdoor location;
    transmitting a plurality of signals via respective antennas, each of said signals comprising a plurality of GNSS navigational signals generated using a respective set of ranging codes,
    wherein said sets of ranging codes are insufficient to lock a GNSS receiver located in a region outside said overlapping antenna radiation patterns and are sufficient to lock a GNSS receiver located inside said region.

12. A method according to claim 11, wherein said GNSS receiver is integrated into a system and said method comprises obtaining test data from said system.

13. A method according to claim 12, wherein said system comprises one of: a ground-based vehicle, a manned aerial vehicle and an unmanned aerial vehicle.

14. A method according to claim 11, further comprising analyzing said test data to determine a resilience of said GNSS receiver to GNSS spoofing.

15. A method according to claim 11, wherein said sets of ranging codes are selected cooperatively by a plurality of signal generators configured to generate said signals.

16. A method according to claim 11, further comprising providing said sets of ranging codes over a communication network to respective signal generators configured to generate said signals.

17. A method according to claim 11, wherein said sets of ranging codes are preset.

18. A method according to claim 11, further comprising synchronizing said signals in time and phase.

19. A method according to claim 11, wherein said antennas have an effective radiation pattern with a maximum gain of 3 dBi to 30 dBi.

20. A method according to claim 11, further comprising obtaining test data from a GNSS receiver operating inside said region.

* * * * *